US006857681B2

United States Patent
Nakajima

(10) Patent No.: US 6,857,681 B2
(45) Date of Patent: Feb. 22, 2005

(54) CONNECTING STRUCTURE OF AIR DUCT OF VEHICULAR AIR CONDITIONING UNIT

(75) Inventor: Hiroshi Nakajima, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/656,626

(22) Filed: Sep. 5, 2003

(65) Prior Publication Data

US 2004/0046424 A1 Mar. 11, 2004

(30) Foreign Application Priority Data

Sep. 5, 2002 (JP) ....................... 2002-259709

(51) Int. Cl.$^7$ ............... B62D 25/14; B62D 27/00
(52) U.S. Cl. ............................ 296/70; 216/21
(58) Field of Search ............... 296/70, 193.03, 296/193.04, 208, 29, 190.09; 454/121, 127, 141, 142, 143, 145, 152, 162, 903, 126, 156, 160

(56) References Cited

U.S. PATENT DOCUMENTS

| 3,024,717 | A | * | 3/1962 | Rozek ................... 454/275 |
| 3,096,933 | A | * | 7/1963 | Bora ..................... 417/247 |
| 3,608,469 | A | * | 9/1971 | Mutoh et al. ........... 454/127 |
| 4,245,965 | A | * | 1/1981 | Brown ................... 417/360 |
| 4,712,589 | A | * | 12/1987 | De Gaspari ............. 141/25 |
| 4,893,376 | A | * | 1/1990 | Sunagawa et al. ....... 15/337 |
| 5,584,129 | A | * | 12/1996 | Williamson ............. 34/235 |
| 6,409,590 | B1 | * | 6/2002 | Suzuki et al. ........... 454/143 |
| 6,705,672 | B2 | * | 3/2004 | Shikata et al. ......... 296/208 |
| 6,733,381 | B1 | | 5/2004 | Ploeger |

* cited by examiner

Primary Examiner—D. Glenn Dayoan
Assistant Examiner—H. Gutman
(74) Attorney, Agent, or Firm—Harness, Dickey & Pierce, PLC

(57) ABSTRACT

In a connecting structure of an air duct of a vehicular air conditioning unit, an end of the air duct is engaged with an air conditioning case when an instrument panel is mounted on a vehicle body with the air duct. Therefore, a sealing member such as packing is not required between the connecting portions of the end of the air duct and an air outlet port of the case.

5 Claims, 3 Drawing Sheets

CONNECTING STRUCTURE OF AIR DUCT OF VEHICULAR AIR CONDITIONING UNIT

CROSS REFERENCE TO RELATED APPLICATION

This application is based on Japanese Patent Application No. 2002-259709 filed on Sep. 5, 2002.

FIELD OF THE INVENTION

The present invention relates to a connecting structure of an air duct connecting between a vehicular air conditioning unit and an instrument panel.

BACKGROUND OF THE INVENTION

In general, conditioning air from an air conditioning unit is introduced to an air blowing port of an instrument panel through an air duct and blown into a passenger compartment. The air duct is connected to a case of the air conditioning unit and the instrument panel in manners shown in FIGS. 4A and 4B, for example.

According to the first manner shown in FIG. 4A, a tubular air duct 13 is first fastened to a case 2a of an air conditioning unit 2 by tapping screws 4. Then, the case 2a and the air duct 13 are mounted on a vehicle body B. In this condition, an instrument panel 1 is mounted on the vehicle body B so that an end 13a of the air duct 13 is connected to an air blowing port 1a of the instrument panel 1. Here, a sealing member 5 such as urethane packing is provided between the end 13a of the air duct 13 and the air blowing port 1a of the instrument panel 1 for sealing between them.

According to the second manner shown in FIG. 4B, the air conditioning unit 2 is previously mounted on the vehicle body B. The first end 13a of the air duct 13 is fastened to the air blowing port 1a of the instrument panel 1 by the tapping screws 4. In this condition, the instrument panel 1 is fixed to the vehicle body B with the air duct 13, so the second end 13b of the air duct 13 is located on and communicated with an air outlet port of the case 2a. The sealing member 5 is provided between the connecting portions of the second end 13b and the air outlet port of the case 2a.

Since the sealing member 5 is required between the connecting portions of the air duct 13 and the case 2a, the numbers of parts and working steps increase. Further, this results in an increase of costs in the assembly.

Also, when the large instrument panel 1 is fixed, the air duct 13 is shielded by the instrument panel 1. Accordingly, it is difficult to check that the end of the air duct 13 is properly connected. This results in a deterioration of workability of fixing the instrument panel 1. With regard to the second manner, it is likely to be difficult to position the end 13b of the air duct 13 to the air outlet port of the case 2a because of size and shape variations of the air duct and the air conditioning unit 2.

SUMMARY OF THE INVENTION

The present invention is made in view of the foregoing matter and it is an object of the present invention to provide a connecting structure of an air duct of a vehicular air conditioning unit capable of reducing the numbers of parts and working steps.

It is another object to provide a simple and reliable connecting structure of an air duct and a case of an air conditioning unit capable of improving assembling workability.

According to a connecting structure of the present invention, an air conditioning case of an air conditioning unit, which is mounted on a vehicle, forms an air outlet port through which air is discharged. An air duct for introducing the air from the case to a passenger compartment of the vehicle has a first end connecting to an air blowing port of an instrument panel and a second end connecting to the air outlet port of the case. The second end of the air duct is engaged with the air conditioning case by mounting the instrument panel on a vehicle body.

Since the second end of the air duct engages with the air conditioning case, a sealing member such as packing for sealing between the second end of the air duct and the air outlet port of the case is not required. Accordingly, the numbers of component parts and working steps reduce.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Embodiments of the present invention will be described hereinafter with reference to the drawings.

First Embodiment

Figure 1A:
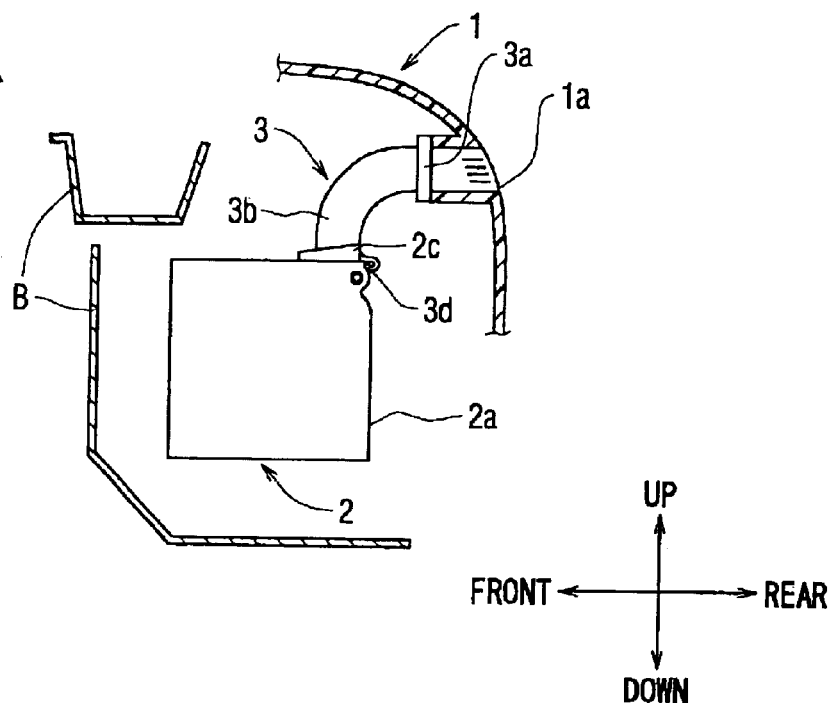
FIG. 1A is a schematic view, partly includes a cross-section, of an air conditioning unit mounted on a vehicle for showing arrangement of an air duct of the unit according to the first embodiment of the present invention.

As shown in FIG. 1A, an instrument panel 1 is generally mounted at a front position in a passenger compartment of a vehicle. A vehicular air conditioning unit 2 is generally installed in a space formed in an instrument panel 1. Conditioning air from the air conditioning unit 2 is introduced into the passenger compartment through a tubular air duct 3. The air duct 3 is connected to an instrument panel 1.

Figure 2:
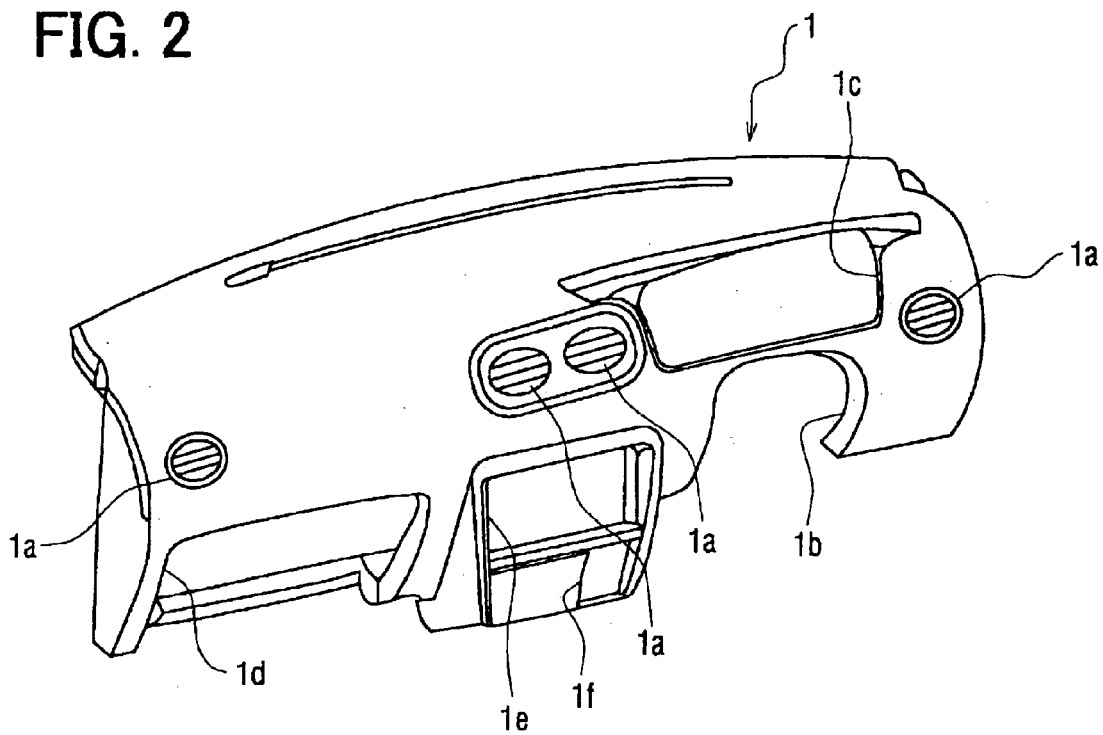
FIG. 2 is a schematic perspective view of an instrument panel to which the air duct is connected according to the first embodiment of the present invention.

As shown in FIG. 2, the instrument panel 1 generally forms conditioning air blowing ports 1a at positions adjacent to right and left ends and substantially middle positions. The conditioning air is blown into the passenger compartment from the air blowing ports 1a. The instrument panel 1 also forms a notched portion 1b and an opening 1c on a driver seat side. A steering shaft is generally disposed to pass through the notched portion 1b. A meter unit is installed in the opening 1c. Further, the instrument panel 1 forms an opening 1d for a glove box on a passenger seat side and openings 1e for such as an air conditioner control panel or a vehicular audio unit in substantially a middle portion in a vehicle left and right direction. Further, the instrument panel 1 has an opening 1f for an ashtray below the openings 1e.

The air conditioning unit 2 is to maintain a condition of temperature in the passenger compartment. The air conditioning unit 2 sucks an inside air inside the passenger compartment and an outside air outside the passenger compartment. After the air is heated and cooled in the air conditioning unit 2, the air is blown into the passenger compartment through the air duct 3 and the conditioning air blowing ports 1a. Grilles are generally provided in the conditioning air blowing ports 1a. The grilles are disposed slidably and movably for adjusting directions of air blowing into the passenger compartment.

The instrument panel 1, the air conditioning unit 2, and the air duct 3 are assembled in a following manner. First, a first end 3a of the air duct 3 is connected to the conditioning air blowing ports 1a by a fastening device such as tapping screws. In this condition, the instrument panel 1 is mounted on a vehicle body B with the air duct 3, so a second end 3b of the air duct 3 is connected to an air outlet port 2b of an air conditioning case 2a of the air conditioning unit 2, as shown in FIG. 1A. Here, front and rear, and left and right arrows in the drawings denote arrangement directions of the air conditioning unit 2 and the air duct 3 with respect to the vehicle body B when mounted on the vehicle body B.

Next, the connection of the air conditioning unit 2 and the air duct 3 will be described in detail.

Figure 1B:
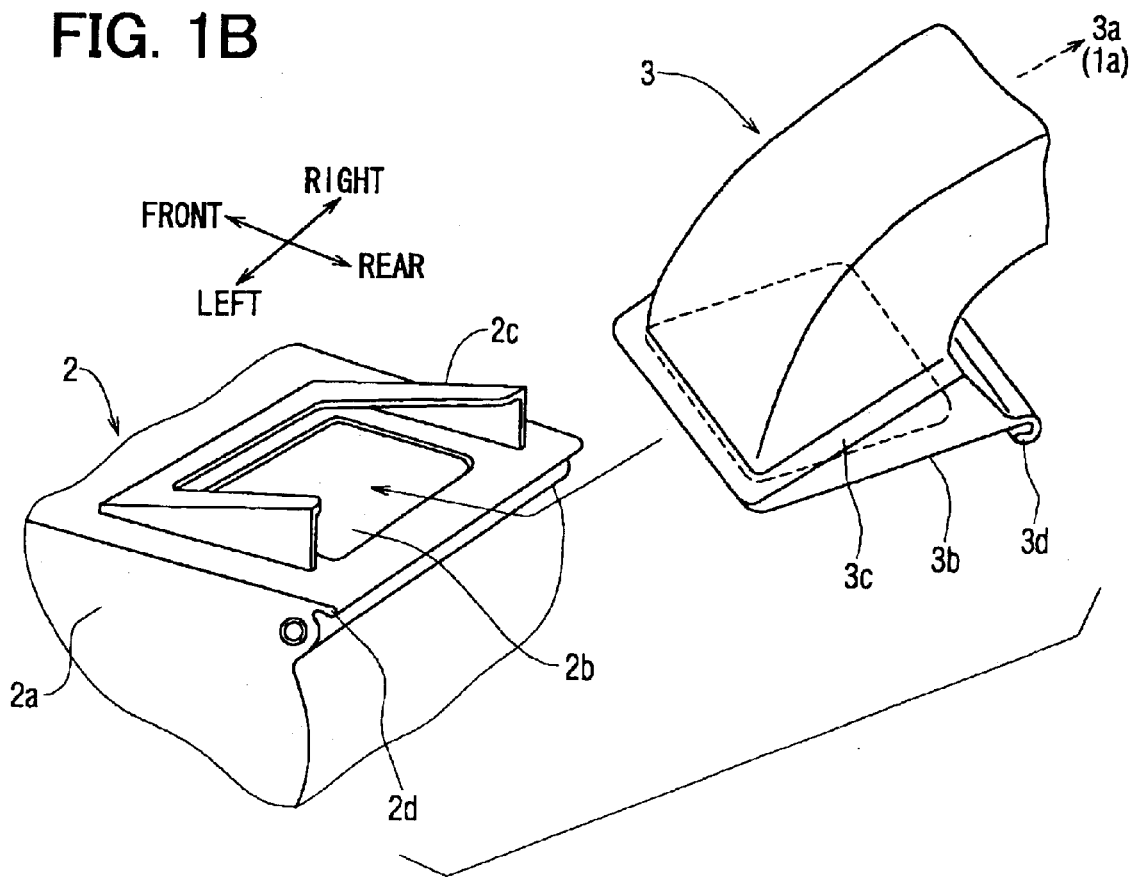
FIG. 1B is a perspective view of connecting portions of the air duct and the air conditioning unit according to the first embodiment of the present invention.

As shown in FIG. 1B, the air conditioning case 2a has the air outlet port 2b through which the conditioning air is discharged from the case 2a. The air outlet port 2b is for example formed on the top surface of the case 2a. The case 2a has a guide portion 2c on the periphery of the air outlet port 2b for receiving and engaging with the second end 3b of the air duct 3. The guide portion 2c has substantially U-shape, which opens to a rear side of the vehicle. Also, the guide portion 2c has substantially U-shaped cross-section with the wall of the case 2a. The guide portion 2c is tapered toward the front side of the vehicle. Thus, the dimension of the guide portion 2c gradually reduces from the rear position (opening of the U-shape) toward the front position, with respect to a direction perpendicular to the top surface of the case 2 and a direction parallel to the top surface of the case 2a. Further, the case 2a has a linear projection 2d on a rear side of the air outlet port 2b. The linear projection 2d protrudes toward the rear side of the vehicle and slightly bulges at its tip end.

The second end 3b of the air duct 3 has a flange portion 3c having a shape corresponding to the shape of the guide portion 2c. In a condition that the flange portion 3c is received in and engaged with the guide portion 2c, the top wall of the air conditioning case 2a on the periphery of the air outlet port 2b and an inside wall of the guide portion 2c are in close-contact with the wall of the flange portion 3c, so that the connections between the case 2a and the second end of the air duct 3b are sealed.

The flange portion 3c has a U-shaped hook portion 3d at a position corresponding to the linear projection 2d of the case 2a. The U-shaped portion 3d has substantially a U-shaped cross-section an opening of which is slightly narrowed, so that the U-shaped portion 3d fits on the linear projection 2d. As the second end of the air duct 3b is inserted into the guide portion 2c, the U-shaped portion 3d engages with the linear projection 2d. Therefore, the engagement of the linear projection 2d and the U-shaped portion 3d restricts the flange portion 3c from separating from the guide portion 2c.

The air conditioning case 2a is molded by injection molding of resin, such as polypropylene, having elasticity and strength. On the other hand, the air duct 3 is formed by blow molding of resin having flexibility such flexible polyurethane.

The case 2a, the guide portion 2c and the linear projection 2d are integrally molded into a single article. The air duct 3, the flange portion 3c and the U-shaped portion 3d are integrally molded into a single article. Alternatively, the guide portion 2c and the linear projection 2d can be separately made by another material such as metal and can be fixed to the case 2a. Also, the flange portion 3c and the U-shaped portion 3d can be separately made by another material such as metal and can be fixed to the air duct 3.

The air outlet port 2b of the case 2a and the second end 3b of the air duct 3 are air-tightly connected by engaging the flange portion 3c with the guide portion 2c. Therefore, sealing members or packing are not required between the connecting portions of the case 2a and the air duct 3. Accordingly, the numbers of parts and working steps reduce.

When the instrument panel 1 is mounted on the vehicle body B, the flange portion 3c of the air duct 3 is directed by and inserted into the guide portion 2c formed on the periphery of the air outlet port 2b of the case 2a. Therefore, the second end 3b of the air duct 3 is easily and securely engaged with the case 2a. This improves workability of fixing the instrument panel 1.

The guide portion 2c is tapered toward the front position of the vehicle body with respect to the up and down and left and right directions of the vehicle body B. That is, the height and width of the guide portion 2c increase toward its opening into which the flange portion 3c of the air duct 3 is inserted. Thus, the tapered-shape functions as a guide for directing and inserting the flange portion 3c into the guide portion 2c. When the instrument panel 1 and the air duct 3 is fixed to the vehicle body B, the second end 3b of the air duct 3 is easily and securely engaged with the air conditioning case 2a even if it is shielded by the instrument panel 1. Further, the guide portion 2c is integrally formed with the air conditioning case 2a. Thus, the numbers of parts and working steps reduce. Further, it is possible to reduce manufacturing costs.

Second Embodiment

Figure 3:
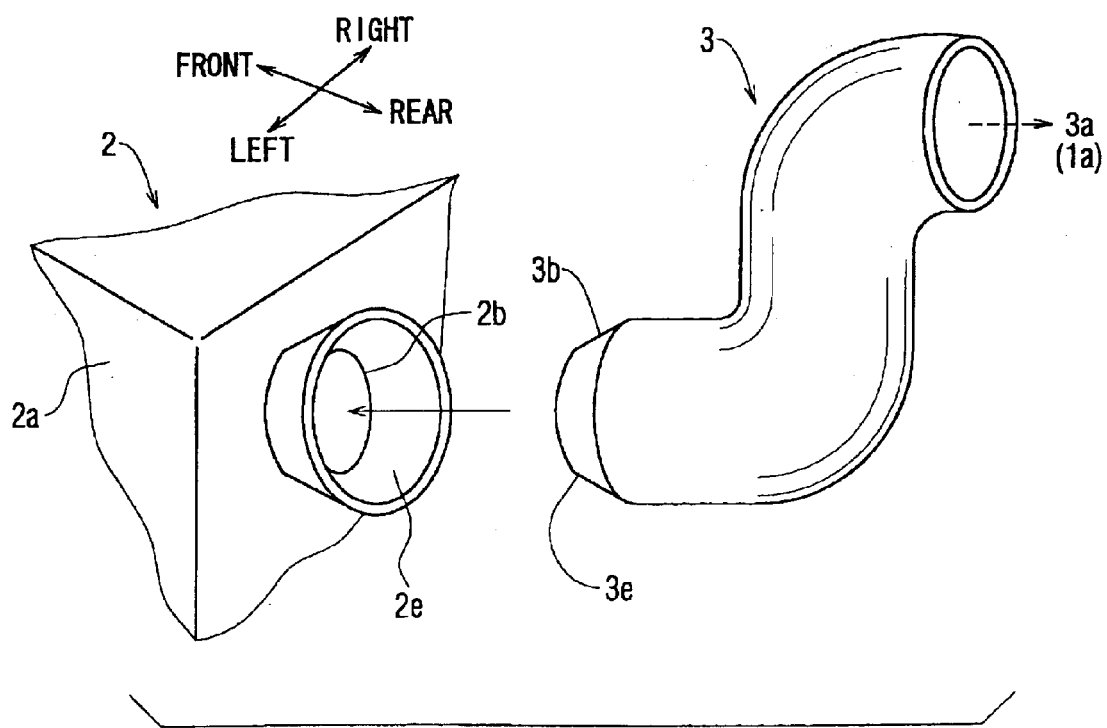
FIG. 3 is a perspective view of connecting portions of the air duct and the air conditioning unit according to the second embodiment of the present invention.
Figure 4A:
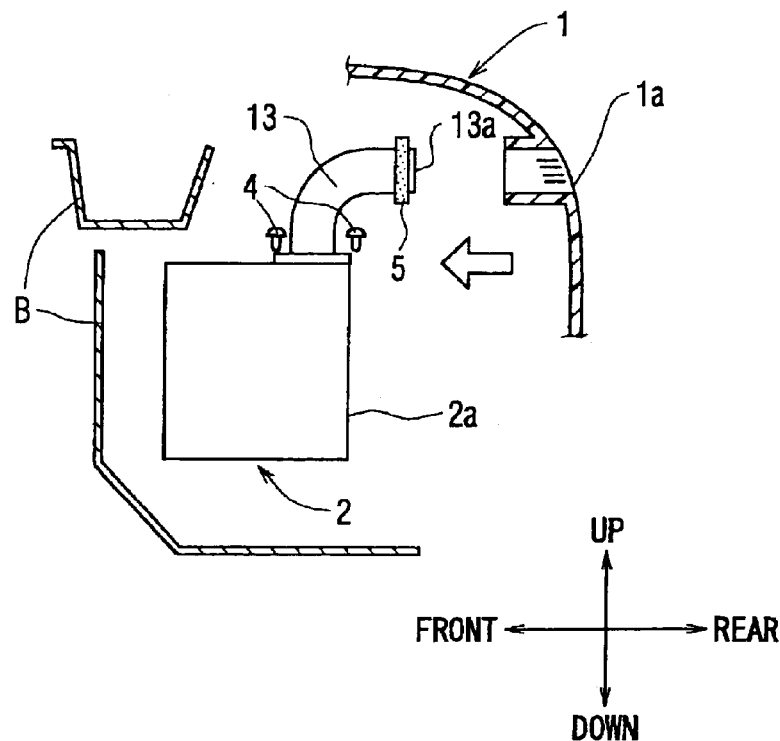
FIG. 4A is a schematic view, partly includes a cross-section, of an air duct connecting to an air conditioning unit of a vehicle and an instrument panel according to a related art.
Figure 4B:
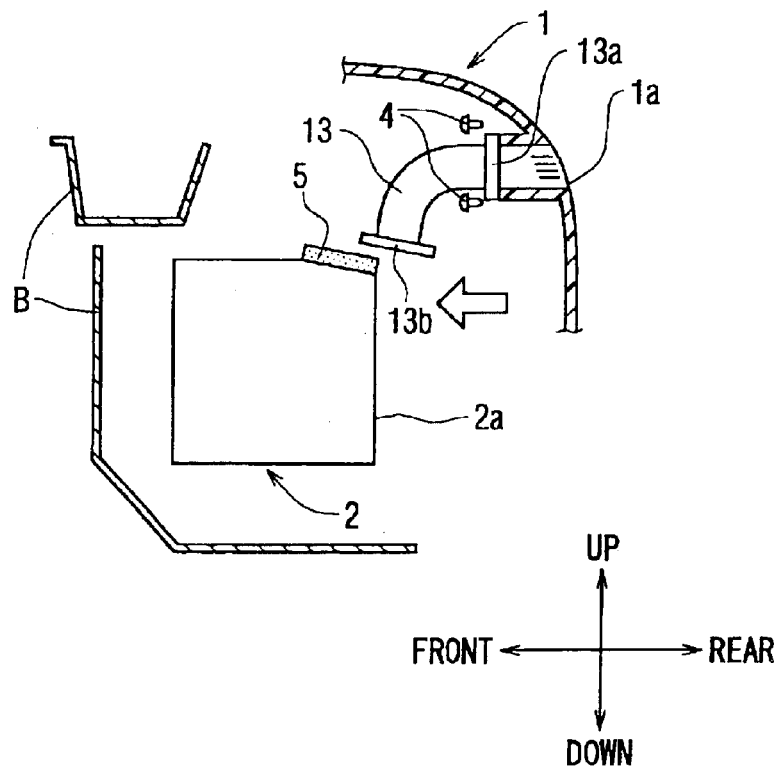
FIG. 4B is a schematic view, partly includes a cross-section, of an air duct connecting to an air conditioning unit of a vehicle and an instrument panel according to a related art.

The connection between the air duct 3 and the air conditioning case 2a has a configuration different from that of the first embodiment, as shown in FIG. 3. The air conditioning case 2a has the air outlet port 2b on a surface (rear surface), which is substantially vertical and faces the instrument panel 1. A guide portion 2e is formed on the periphery of the air outlet port 2b. The guide portion 2e has a shape tapered toward the front of the vehicle.

The second end 3b of the air duct 3 is tapered to its tip end (tapered end 3e) to correspond to the taper shape of the guide portion 2e. Thus, when the instrument panel 1 is fixed to the vehicle body B, the second end 3b of the air duct 3 is directed into and engaged with the guide portion 2e of the case 2a to seal between them.

Accordingly, the sealing members and packing are not required between the second end 3b of the air duct 3 and the air outlet port 2b of the case 2a. Also, the guide portion 2e is integrally formed into the case 2a. Therefore, the numbers of parts and working steps reduce. Further, the manufacturing cost reduce.

Since the guide portion 2e functions as the guide for directing the second end 3b of the air duct 3 therein, the air duct 3 is easily and securely connected to the air conditioning case 2a even if it is shielded by the instrument panel 1 when mounted on the vehicle body B. Accordingly, the taper-shaped connecting portions results in an improvement of workability of mounting the instrument panel 1.

In a case that an extension duct is required between the air conditioning case 2a and the air duct 3, the above connecting structure can be provided between connecting portions that are connected to each other by mounting the instrument panel 1 to the vehicle body B. For example, an upstream end of the extension duct is previously connected to the air outlet port 2b of the case 2a. A downstream end of the extension duct and the second end 3b of the air duct 3 is connected at the timing as fixing the instrument panel 1. In this case, the downstream end of the extension duct 3 and the second end 3b of the air duct 3 have taper shapes.

The present invention should not be limited to the disclosed embodiments, but may be implemented in other ways without departing from the spirit of the invention.

What is claimed is:

1. A connecting structure comprising:

an air conditioning case of an air conditioning unit, which is mounted on a vehicle, forming an air outlet port through which air is discharged; and an air duct for introducing the air from the air conditioning case to a passenger compartment of the vehicle, the air duct having a first end connecting to an air blowing port of an instrument panel of the vehicle and a second end connecting to the air outlet port of the air conditioning case; wherein the second end of the air duct is engaged with the air conditioning case by mounting the instrument panel on the vehicle;

the air conditioning case has a guide portion on the periphery of the air outlet port for directing the second end of the air duct; and the guide portion is tapered toward a front position of the vehicle.

2. The connecting structure according to claim 1, wherein the guide portion and the air conditioning case are integrally formed.

3. The connecting structure according to claim 1, wherein the second end of the air duct has a flange portion for engaging with the guide portion.

4. The connecting structure according to claim 3, wherein the flange portion is air-tightly received in the guide portion.

5. A connecting structure comprising:

an air conditioning case of an air conditioning unit, which is mounted on a vehicle, forming an air outlet port through which air is discharged; and an air duct for introducing the air from the air conditioning case to a passenger compartment of the vehicle, the air duct having a first end connecting to an air blowing port of an instrument panel of the vehicle and a second end connecting to the air outlet port of the air conditioning case; wherein the second end of the air duct is engaged with the air conditioning case by mounting the instrument panel on the vehicle;

the air conditioning case has a guide portion on the periphery of the air outlet port for directing the second end of the air duct; and the air conditioning case has a projection adjacent to the guide portion and the second end of the air duct has a U-shaped portion, wherein when the second end of the air duct engages with the guide portion, the U-shaped portion fits on the projection.

* * * * *